United States Patent [19]

Taylor et al.

[11] 4,317,801

[45] Mar. 2, 1982

[54] RECOVERY OF MOLYBDENUM FROM SPENT CATALYST SOLUTIONS FROM HYDROPEROXIDE EPOXIDATIONS

[75] Inventors: Paul D. Taylor, Flemington; Michael T. Mocella, East Windsor, both of N.J.

[73] Assignee: Atlantic Richfield Company, Los Angeles, Calif.

[21] Appl. No.: 226,968

[22] Filed: Jan. 21, 1981

[51] Int. Cl.$^3$ .............................................. C01G 39/06
[52] U.S. Cl. ....................................... 423/54; 423/55; 423/561 R; 252/414; 252/420
[58] Field of Search .................................... 423/53–55, 423/561 R; 252/414, 420

[56] References Cited

U.S. PATENT DOCUMENTS

| 2,112,292 | 3/1938 | James | 423/55 |
| 3,763,303 | 10/1973 | Khuri et al. | 423/54 |
| 3,931,044 | 1/1976 | Maurin | 252/414 |

FOREIGN PATENT DOCUMENTS

| 7216853 | 6/1973 | Netherlands | 423/53 |
| 1317480 | 5/1973 | United Kingdom | 423/54 |
| 633811 | 11/1978 | U.S.S.R. | 423/53 |

Primary Examiner—Herbert T. Carter
Attorney, Agent, or Firm—Michael S. Jarosz

[57] ABSTRACT

In the process of recovering molybdenum from a spent catalyst solution obtained from a crude reaction product of a molybdenum catalyzed epoxidation of an olefin with an organic hydroperoxide from which crude reaction product epoxide and an alcohol corresponding to the hydroperoxide is removed, the improvement comprises removing and recovering dissolved molybdenum as a high molybdenum content solid by subjecting the spent catalyst solution to a liquid-to-liquid extraction with an aqueous extract to form a two phase system, separating the molybdenum-rich aqueous extract and precipitating therefrom a high molybdenum content solid by heating the aqueous extract in the presence of hydrogen sulfide or a water soluble sulfide salt.

3 Claims, No Drawings

RECOVERY OF MOLYBDENUM FROM SPENT CATALYST SOLUTIONS FROM HYDROPEROXIDE EPOXIDATIONS

BACKGROUND OF THE INVENTION

Oxirane compounds such as ethylene oxide, propylene oxide, and their higher homologs are valuable articles of commerce. One of the most attractive processes for synthesis of those oxirane compounds is described by Kollar in U.S. Pat. No. 3,351,635. According to Kollar, the oxirane compound (e.g., propylene oxide) may be prepared by epoxidation of an olefinically unsaturated compound (e.g., propylene) by use of an organic hydroperoxide and a suitable catalyst such as molybdenum.

During the epoxidation reaction the hydroperoxide is converted almost quantitatively to the corresponding alcohol. That alcohol may be recovered as a coproduct with the oxirane compound. However, it is the oxirane which is of primary concern.

Kollar teaches that oxirane compounds may be prepared from a wide variety of olefins. Lower olefins having three or four carbon atoms in an aliphatic chain are advantageously epoxidized by the process. The class of olefins commonly termed alpha olefins or primary olefins are epoxidized in a particularly efficient manner by the process. It is known to those in the art that primary olefins, e.g., propylene, butene-1, decene-1 hexadecene-1 etc., are much more difficultly epoxidized than other forms of olefins, excluding only ethylene. Other forms of olefins which are much more easily epoxidized are substituted olefins, alkenes with internal unsaturation, cycloalkenes and the like. Kollar teaches that notwithstanding the relative difficulty in epoxidizing primary olefins, epoxidation proceeds more effeciently when molybdenum, titanium or tungsten catalysts are used. Molybdenum is of special interest. Kollar teaches that activity of those metals for epoxidation of the primary olefins is surprisingly high and can lead to high selectivity of propylene to propylene oxide. These high selectivities are obtained at high conversions of hydroperoxide (50% or higher) which conversion levels are important for commercial utilization of the technology.

Kollar's epoxidation reaction proceeds under pressure in the liquid state and, accordingly, a liquid solution of the metal catalyst is preferred. Preparation of a suitable catalyst is taught by Sheng et al in U.S. Pat. No. 3,434,975. According to Sheng, the reaction-medium soluble epoxidation catalyst may be prepared by reacting molybdenum metal with an organic hydroperoxide, per acid or hydrogen peroxide in the presence of a saturated alcohol having one to four carbon atoms.

When propylene is epoxidized with tertiary-butyl hydroperoxide according to the Kollar process using the Sheng catalyst, a product mixture containing unreacted propylene, propylene oxide, tertiary-butyl alcohol and molybdenum catalyst is obtained. Distillation of that product mixture provides substantially pure propylene oxide and tertiary-butyl alcohol. The residue of distillation (hereafter "TBA bottoms") contains spent molybdenum catalyst as well as high boiling organic residues.

Removal and recovery of the molybdenum values from the distillation residue are important from ecological and economical standpoints. In U.S. Pat. No. 3,763,303 Khuri et al disclose two embodiments of a process for recovering molybdenum values from spent epoxidation catalysts. The Khuri process first embodiment involves recovery of molybdenum directly from the spent catalyst mixture by a liquid-to-liquid extraction utilizing an aqueous extractant consisting essentially of water which is intermittently admixed with the residue to be treated to effect an extraction and transfer of a portion of the molybdenum constituent from the organic phase to the aqueous phase. Untreated spent catalyst solutions usually contain molybdenum in concentrations of from about 0.1% to about 1.0% by weight and Khuri discloses those solutions are highly satisfactory for treatment in the liquid-to-liquid extraction process in which the extractant consists essentially of water to effect molybdenum separation. Molybdenum separated with the aqueous extract is recovered as molybdenum trioxide by evaporation of water followed by calcination of the solid obtained by extract evaporation.

The second embodiment of the Khuri process relates to extracting molybdenum from distillation residues obtained from distillation of spent catalyst solution (TBA bottoms) but the extraction is performed with acids or bases to convert the molybdenum into a recoverable molybdenum compound of the acid or base.

British Pat. No. 1,317,480 also teaches recovery of molybdenum values from spent epoxidation catalysts. As in Khuri, the British recovery process involves extracting the spent catalyst solution with water alone or with aqueous ammonia. The British extraction process results in a transfer of at least 95% of the available molybdenum values to the aqueous extract. Those molybdenum values are recovered from the aqueous phase by precipitation as a phosphomolybdate or by distillative stripping of the volatile organic material and water from the extract.

The spent catalyst solution may also be subjected to exhaustive evaporation or distillation to produce a residue with a higher molybdenum content as taught by Levine et al in U.S. Pat. No. 3,819,663. The Levine process starts with a spent catalyst solution such as TBA bottoms and subjects that solution to a wiped film evaporation at 375° to 450° F. until 60 to 80% by weight of the solution is evaporated overhead. The residue of that evaporation is taught to be useful as a catalyst in further epoxidation processes.

According to Tave (U.S. Pat. No. 3,463,664) TBA bottoms may be treated with aqueous ammonium phosphate to precipitate molybdenum solids from the organic solution. Precipitated molybdenum solids of Tave are ammonium phosphomlybdate.

SUMMARY OF THE INVENTION

It has now been discovered that the molybdenum content of an aqueous extract of a spent catalyst solution can be substantially lowered by precipitating dissolved molybdenum with a hydrogen sulfide or a water soluble sulfide salt.

The invention relates to an improvement in separating components of a reaction mixture obtained from epoxidizing an olefin with an orgaic hydroperoxide in the presence of a liquid molybdenum catalyst wherein the product epoxide and the alcohol corresponding to the hydroperoxide are removed from the reaction mixture leaving a spent catalyst solution wherein the improvement comprises removing and recovering dissolved molybdenum as a high molybdenum content solid by subjecting the spent catalyst solution to a liquid-to-liquid extraction with an aqueous extract to produce a two phase system, separating the molybdenum-rich aqueous extract and precipitating therefrom a high molybdenum content solid by heating the aqueous extract in the presence of hydrogen sulfide or a water soluble sulfide salt. As used in the present specification and the annexed claims, the term "spent catalyst solution" is intended to mean that fraction of the epoxidation reaction product effluent remaining after removal of unreacted olefin (for example, propylene), alkylene oxide (for example, propylene oxide) and a major portion of the alcohol corresponding to the hydroperoxide (for example, tertiary butyl hydroperoxide) used in the epoxidation reaction which reaction may be according to the procedure of Kollar, the teachings of which are hereby incorporated by reference in their entirety. Spent catalyst solution, apart from molybdenum compounds, contains some alcohol, acids and other low molecular weight oxygenated compounds and said spent catalyst solution is generally not subjected to any chemical treatment before being subjected to the process of the present invention. It is contemplated that spent catalyst solution as used herein includes both the distillation bottoms treated in British Pat. No. 1,317,480 and the residue obtained from the wiped film evaporation process according to Levine and said spent catalyst solution can contain molybdenum compounds at levels of up to 5% by weight.

Accordingly, it is an object of this invention to provide a method of recovery of molybdenum values from spent catalyst solutions by an aqueous extraction of the spent catalyst solution followed by precipitating molybdenum from the aqueous extract.

Another object is to effectively separate molybdenum from the organic residue of TBA bottoms sufficiently that the organic portion may be disposed without significant environmental pollution and the molybdenum may be recovered as a solid.

Yet another object of the invention is to recover valuable molybdenum as solid compounds which may be calcined to provide an economically important article of commerce.

These and other objects of the invention will become apparent from the following description of the invention and the examples.

DETAILED DESCRIPTION OF THE INVENTION

The present invention involves a highly effective means for separating organic residues from molybdenum values in spent catalyst solutions from hydroperoxide oxidations of olefins. By use of the present invention, the level of molybdenum contained in the organic residues is reduced to a very low level which permits disposal of the organic residue by conventional means (e.g., by burning) without molybdenum pollution of the environment. Furthermore, this invention provides a means for recovering solid molybdenum compounds which are per se valuable for their molybdenum content.

The molybdenum catalyzed hydroperoxide oxidation (epoxidation) of olefins from which the spent catalyst solution is obtained is described by Kollar, discussed above. Kollar describes a wide variety of olefins which can be epoxidized by a wide variety of peroxides under the influence of molybdenum catalysts. The present invention is applicable to separating solid molybdenum compounds from the organic residues of spent catalyst solutions obtained from the epoxidation of any of the olefins disclosed by Kollar using any of the peroxides disclosed by Kollar. Thus the present invention has general applicability for separating molybdenum from the organic portion of any spent catalyst solution as defined above.

Epoxidation of an olefin is suitably accomplished by charging a reactor with the olefin to be oxidized, an organic hydroperoxide and a soluble molybdenum catalyst which is prepared according to Sheng, discussed above. After epoxidation under the conditions taught by Kollar, the product epoxide is removed from the reaction mixture leaving a by-product mixture containing, inter alia, spent catalyst solution and an alcohol corresponding to the hydroperoxide reactant employed. For instance, when tertiary-butyl hydroperoxide is employed in the epoxidation, tertiary-butyl alcohol is formed. The alcohol is also distilled from the by-product solution leaving as a residue the spent catalyst solution containing molybdenum values and higher molecular weight organic residues.

The spent catalyst solution is then subjected to an aqueous liquid-to-liquid extraction for separation of molybdenum values from the organic residues. An improved extraction process is disclosed in our copending application entitled "Recovery of Molybdenum As An Aqueous Solution", Ser. No. 226,967 filed on even date herewith. According to our copending application, molybdenum may be extracted into water without an added acid or base when the spent catalyst solution is extracted with water and a water-immiscible organic solvent for the organic residue.

After the molybdenum-rich aqueous phase is separated from the organic residue phase, molybdenum can be precipitated from the aqueous solution as a solid compound by addition of hydrogen sulfide or a water soluble sulfide salt with heating. Addition of those compounds to the molybdenum-rich aqueous extract at elevated temperatures accelerates the rate of precipitation of molybdenum from solution and this process permits use of milder precipitating conditions than prior art processes.

Any water-soluble sulfide salt is effective to achieve precipitation of molybdenum values. Particularly suitable are the alkali metal salts, alkaline earth salts and ammonium salts. Particularly suitable salts useful to precipitate molybdenum are sodium sulfide, magnesium sulfide, potassium sulfide and calcium sulfide. Sodium sulfide is most preferred. When hydrogen sulfide is used as the precipitating agent, the hydrogen sulfide may be added directly or generated in situ according to procedures familiar to those in the art.

Precipitation of molybdenum values from the aqueous solution is achieved by use of a molar ratio of hydrogen sulfide or sulfide salt to molybdenum content of about 1 to 100 with the preferred ratio being about 10 times sulfide to molybdenum. Temperatures from room temperature to about 150° C. are suitable to effect precipitation in a time period of up to 3 hours. The preferred range of temperatures for precipitation is 50° to 125° C. but lower temperatures may be used if the longer precipitation times required are acceptable. The sulfide may be added to the aqueous solution as a solid or dissolved in a suitable solvent such as water. However, direct addition of the solid salt is preferred to minimize the volume of liquid handled.

It is altogether surprising that sulfides are effective to precipitate molybdenum according to the present invention. The ability to precipitate molybdenum from aqueous extracts of spent catalyst solutions differentiates sulfides from many other organic and inorganic salts including other inorganic sulfur salts. The following salts were found to be ineffective to precipitate molybdenum from aqueous extracts of spent catalyst solutions even at a level of ten-fold excess of salt to molybdenum:

Sodium acetate
Sodium borate
Sodium bromide
Sodium carbonate
Sodium chloride
Sodium citrate
Sodium hydroxide
Sodium iodide
Sodium nitrate
Sodium nitrite
Sodium oxalate
Sodium silicate
Sodium sulfate
Sodium sulfite
Sodium benzoate
Sodium fluoride
Sodium formate It is believed that the hydrogen sulfide or sulfide salts added to the molybdenum-rich aqueous extract react with the dissolved molybdenum to form insoluble complexes. Those solid molybdenum precipitates can be separated from the liquid by filtration, centrifugation or by permitting the precipitate to sediment followed by decantation of the supernatant liquid. When the content of soluble molybdenum in the aqueous liquid is reduced, according to this invention, to an acceptable level for pollution control purposes, the liquid may be disposed in a conventional manner.

In order to further illustrate the subject matter of the present invention, the following examples are provided. However, it is to be understood that the examples are merely illustrative and are not intended as being restrictive of the invention herein disclosed and as defined by the annexed claims.

EXAMPLE 1

The reaction product of a molybdenum catalyzed epoxidation of propylene with tertiary-butyl hydroperoxide was treated to separate propylene oxide and tertiary-butyl alcohol. The remaining spent catalyst solution was extracted with water to obtain a molybdenum-containing aqueous extract. The aqueous extract contained 2900 ppm soluble molybdenum.

Fifteen grams of the aqueous extract was heated for one hour at 50° C. with 0.91 grams of sodium sulfide in a system open to the air. A black solid precipitate formed and analysis of the treated solution showed that the amount of soluble molybdenum decreased to 1980 ppm. In the absence of sodium sulfide no decrease in molybdenum was observed and no precipitate formed.

EXAMPLE 2

Similarly, 15 grams of the aqueous extract of Example 1 was heated for 1 hour at 100° C. with 1.32 grams of sodium sulfide in a closed system under 200 p.s.i.g nitrogen. Analysis of the resulting solution showed 810 ppm soluble molybdenum.

EXAMPLE 3

The same experimental procedure as in Example 2 was applied to a 15 gram aqueous extract to which 0.33 grams of sodium sulfide was added and the admixture stirred for 16 hours at 25° C. The resulting solution contained 1370 ppm molybdenum. Compared to Example 1, this example shows the benefit of operating in a closed system to prevent the loss of volatile $H_2S$ formed.

What is claimed is:

1. In the process of separating and recovering molybdenum from a spent catalyst solution which is the reaction product of a molybdenum catalyzed epoxidation of an olefin with an organic hydroperoxide after removal of product epoxide and the alcohol corresponding to the hydroperoxide, the improvement comprises removing and recovering dissolved molybdenum as a high molybdenum content solid by subjecting the spent catalyst solution to a liquid-to-liquid extraction with water to produce a two phase system, separating the molybdenum-rich aqueous extract and precipitating therefrom a high molybdenum content solid by heating the aqueous extract in the presence of hydrogen sulfide or a water soluble sulfide salt.

2. The process according to claim 1 wherein the water soluble sulfide salt is an alkali metal sulfide.

3. The process according to claim 1 wherein the water soluble sulfide salt is sodium sulfide.

* * * * *